US012766671B1

(12) United States Patent
Bakker et al.

(10) Patent No.: US 12,766,671 B1
(45) Date of Patent: Oct. 20, 2026

(54) TWEEZERS WITH LOCALIZED DEFORMATION REGION

(71) Applicant: EDJY LLC, Ketchum, ID (US)

(72) Inventors: Chass Nickolas Bakker, Dexter, MI (US); Jake Peters, Ketchum, ID (US); Braden Harkins Becker, Craftsbury, VT (US); Andrew Winfred Lesuer, Lakewood, CO (US)

(73) Assignee: EDJY LLC, Ketchum, ID (US)

( * ) Notice: Subject to any disclaimer, the term of this patent is extended or adjusted under 35 U.S.C. 154(b) by 0 days.

(21) Appl. No.: 19/422,099

(22) Filed: Dec. 16, 2025

Related U.S. Application Data

(63) Continuation of application No. 19/368,135, filed on Oct. 24, 2025.

(51) Int. Cl.
*B25B 9/02* (2006.01)

(52) U.S. Cl.
CPC ................................ *B25B 9/02* (2013.01)

(58) Field of Classification Search
CPC ........................................ B25B 9/02
See application file for complete search history.

(56) References Cited

U.S. PATENT DOCUMENTS

| | | | | |
|---|---|---|---|---|
| 1,269,321 A * | 6/1918 | Schwarz | B25B 9/02 294/99.2 |
| 1,315,808 A * | 9/1919 | Anzelewitz | B25B 9/02 294/99.2 |
| 1,475,689 A * | 11/1923 | Corey | B25B 9/02 294/99.2 |
| 5,385,471 A * | 1/1995 | Chuen | A61C 3/10 433/161 |
| 2009/0267372 A1* | 10/2009 | Chen | B25B 9/02 294/99.2 |
| 2015/0148840 A1* | 5/2015 | Francis | A45D 26/0066 606/210 |

OTHER PUBLICATIONS

Google Search For Tweezers 52-54 HRC, 2026. (Year: 2026).*
PELCO Pro High Precision, 2021. (Year: 2021).*

* cited by examiner

*Primary Examiner* — Stephen A Vu
(74) *Attorney, Agent, or Firm* — OLSHAN FROME WOLOSKY LLP; Barry Greenbaum

(57) ABSTRACT

A tweezers is provided. In a first aspect, the tweezers comprise a first leg and a second leg. The first leg comprises: a distal portion including a tip, a proximal portion having a first thickness, a central portion disposed between the distal portion and the proximal portion, the central portion having a second thickness, and a flexure portion disposed between the central portion and the proximal portion. The flexure portion has a third thickness less than each of the first thickness and the second thickness. The second leg is coupled to the first leg at the proximal portion. Other aspects and features are also claimed and described.

21 Claims, 9 Drawing Sheets

TWEEZERS WITH LOCALIZED DEFORMATION REGION

CROSS-REFERENCE TO PRIOR APPLICATIONS

The present application is a continuation of U.S. patent application Ser. No. 19/368,135, filed Oct. 24, 2025, the disclosure of which is incorporated by reference herein in its entirety.

TECHNICAL FIELD

The present application relates generally to tweezers. More specifically, the present application provides tweezers with a localized deformation region.

BACKGROUND

Tweezers are small, hand-held tools designed for gripping and manipulating tiny objects with precision. Typically made of metal or plastic, tweezers include two arms joined at one end, which can be pinched together to grasp items between tips of the arms. This dual-arm design allows for fine control, making tweezers useful in a wide range of tasks, such as personal grooming, first aid, scientific research, and electronics assembly.

SUMMARY

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

Typical tweezers rely on each entire leg to flex when grasping an item. While this design may enable a simple manufacturing process, tip splay problems may occur as a result, especially if the tips are designed to be parallel. The present disclosure provides a new and innovative tweezers with stiff legs having a localized deformation region that acts as a flexible spring when forces are applied to the legs to grasp an item. With the localized deformation, the tips of the provided tweezers do not splay apart during use or contact at a sharp point. Instead, the tweezers include parallel tip geometry that creates an extended contact surface between the tips.

In an example, a tweezers includes a first leg and a second leg. The first leg comprises: a distal portion including a tip, a proximal portion having a first thickness, a central portion disposed between the distal portion and the proximal portion, the central portion having a second thickness, and a flexure portion disposed between the central portion and the proximal portion. The flexure portion has a third thickness less than each of the first thickness and the second thickness. The second leg is coupled to the first leg at the proximal portion.

In an example, a method includes grasping an object with the tweezers; and moving, via the tweezers, the object that is grasped.

The term "resilient member" as used herein is defined as a component capable of repeatedly storing and releasing energy through elastic deformation. For example, a resilient member may be or act as a spring, such as a lever spring, which may be a machined spring or another suitable type of spring.

The term "coupled" is defined as connected, although not necessarily directly, and not necessarily mechanically. The terms "a" and "an" are defined as one or more unless this disclosure explicitly requires otherwise. The term "substantially" is defined as largely but not necessarily wholly what is specified- and includes what is specified; e.g., substantially 90 degrees includes 90 degrees and substantially parallel includes parallel—as understood by a person of ordinary skill in the art. As used herein, "substantially parallel" and "substantially aligned" each mean within 10 degrees of parallel to, and "substantially perpendicular" means within 10 degrees of perpendicular to.

Furthermore, all numerical ranges herein should be understood to include all integers, whole or fractions, within the range, inclusive of the ends of the ranges. Moreover, these numerical ranges should be construed as providing support for a claim directed to any number or subset of numbers in that range. For example, a disclosure of from 1 to 10 should be construed as supporting a range of from 1 to 8, from 3 to 7, from 1 to 9, from 3.6 to 4.6, from 3.5 to 9.9, and so forth.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The terms "comprise" and any form thereof such as "comprises" and "comprising," "have" and any form thereof such as "has" and "having," and "include" and any form thereof such as "includes" and "including" are open-ended linking verbs. As a result, an apparatus or system that "comprises," "has," or "includes" one or more elements possesses those one or more elements but is not limited to possessing only those elements. Likewise, a method that "comprises," "has," or "includes" one or more steps possesses those one or more steps but is not limited to possessing only those one or more steps.

Any embodiment of any of the apparatuses, systems, and methods can consist of or consist essentially of—rather than comprise/have/include-any of the described steps, elements, and/or features. Thus, in any of the claims, the term "consisting of" or "consisting essentially of" can be substituted for any of the open-ended linking verbs recited above in order to change the scope of a given claim from what it would otherwise be using the open-ended linking verb.

An apparatus or system that is configured in a certain way is configured in at least that way, but it can also be configured in other ways than those specifically described. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

The feature or features of one embodiment may be applied to other embodiments, even though not described or illustrated, unless expressly prohibited by this disclosure or the nature of the embodiments.

Some details associated with the embodiments are described above and others are described below.

Additional features and advantages of the disclosed method and apparatus are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label with a second label that distinguishes among the similar components. If just the first reference label is used in the specification, the description is applicable to any one of the similar components having the same first reference label irrespective of the second reference label. Like reference numbers and designations in the various drawings indicate like elements.

DETAILED DESCRIPTION

The detailed description set forth below, in connection with the appended drawings, is intended as a description of various configurations and is not intended to limit the scope of the disclosure to solely that described explicitly herein. Rather, the detailed description includes specific details for the purpose of providing a thorough understanding of the inventive subject matter. It will be apparent to those skilled in the art that these specific details are not required in every case.

Figure 1A:
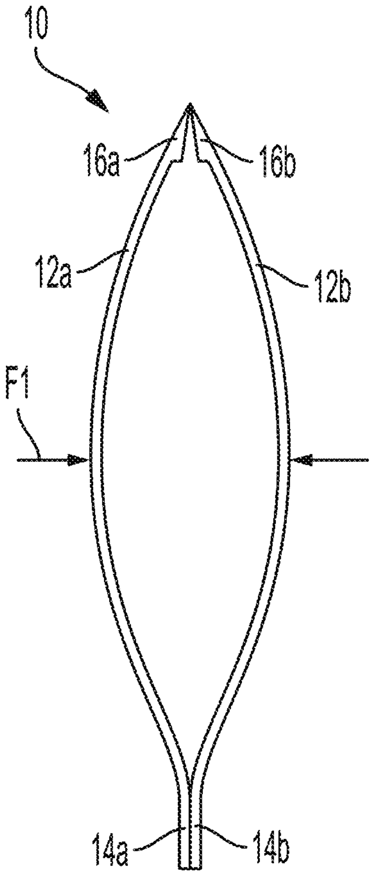
FIG. 1A (PRIOR ART)
FIG. 1A illustrates a side view of a typical tweezers with tips meeting at a sharp point.
Figure 1B:
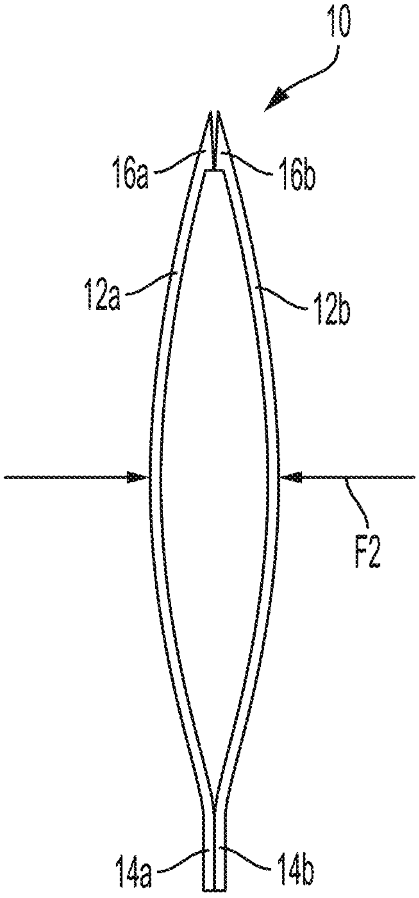
FIG. 1B (PRIOR ART)
FIG. 1B illustrates a side view of a typical tweezers with tips splayed apart.

FIGS. 1A and 1B illustrate an example of a typical tweezers 10 found in the art.

The tweezers 10 include legs 12*a*, 12*b* that each respectively include proximal portions 14*a*, 14*b* and distal portions including tips 16*a*, 16*b*. Typical metal tweezers, such as tweezers 10, are traditionally made of a metal having a hardness of about 30-40 Hardness Rockwell C (HRC) and traditionally have a fairly uniform thickness across the entire length of each leg 12*a*, 12*b*. With this design, when force is applied to the legs 12*a*, 12*b* to pinch the tips 16*a*, 16*b* together, the legs 12*a*, 12*b* flex across the entire length of the tweezers 10, with the amount of flex being proportional to how much force is applied. Additionally, since the tips 16*a*, 16*b* form the distal ends of the legs 12*a*, 12*b*, the angle of the interior surfaces of the tips 16*a*, 16*b* may also change as a function of the force applied.

For example, as shown in FIG. 1A, when a force F1 is applied to the legs 12*a*, 12*b*, the tips 16*a*, 16*b* are brought together only at a sharp point at the distal-most ends of the tips 16*a*, 16*b*. When a force F2 greater than force F1 is applied to the legs 12*a*, 12*b*, the legs 12*a*, 12*b* may flex such that the distal-most ends of the tips 16*a*, 16*b* splay away from another as shown in FIG. 1B, and instead the proximal portions of the tips 16*a*, 16*b* contact one another. Accordingly, this typical tweezers design requires maintaining a delicate balance of force somewhere between force F1 and force F2 for tips 16*a*, 16*b* to fully contact one another. Each of the situations shown in FIGS. 1A and 1B make for a less effective tweezers tip for grasping an object.

Specifically, when the distal-most ends of the tips 16*a*, 16*b* splay away from one another, the gripping force at the distal-most ends is lost, with the gripping force instead being primarily applied towards the proximal ends of the tips 16*a*, 16*b*. The splaying reduces the precision and effectiveness of the tweezers 10 at gripping small objects, such as short hairs.

When only the distal-most ends of the tips 16*a*, 16*b* contact one another, the gripping force between the distal-most ends may not be strong enough to maintain a grip on an object, or if the gripping force is strong enough, it may be difficult for a user to maintain the associated pressure on the legs 12*a*, 12*b* without causing the tips 16*a*, 16*b* to splay. Alternatively, the small contact area where only the distal-most ends of the tips 16*a*, 16*b* contact one another may create a larger than desired point force on the object, thereby damaging the object. For example, the tips 16*a*, 16*b* may cut a hair rather than grip the hair, or may damage an electronics component.

Some typical tweezers may be designed to only have the distal-most ends of the tips touch together. Such designs may mitigate splaying of the distal-most ends, but still may create a larger than desired point force on an object.

Particular implementations of the subject matter described in this disclosure may be implemented to realize one or more of the following potential advantages or benefits. For example, the tweezers described herein provide a more effective tip for precise grasping of an object. In particular, the provided tweezers include legs with flexure portions at which deformation of the legs is localized when a force is applied to the legs to bring the tips together. The tweezers may be made of a harder material than typical tweezers, which enables the flexure portions to have a higher yield strength despite the reduced thickness of the flexure portions. By localizing the deformation in this way, the contact surfaces of the tips may be consistently parallel when brought together regardless of the force applied to the legs, which increases the contact area between the tips and reduces (e.g., eliminates) splaying of the tips.

Shortcomings mentioned here are only representative and are included to highlight problems that the inventors have identified with respect to existing tweezers and sought to improve upon. Aspects of tweezers described below may address some or all of the shortcomings as well as others known in the art. Aspects of the improved tweezers described herein may present other benefits than, and be used in other applications than, those described above.

Figure 2:
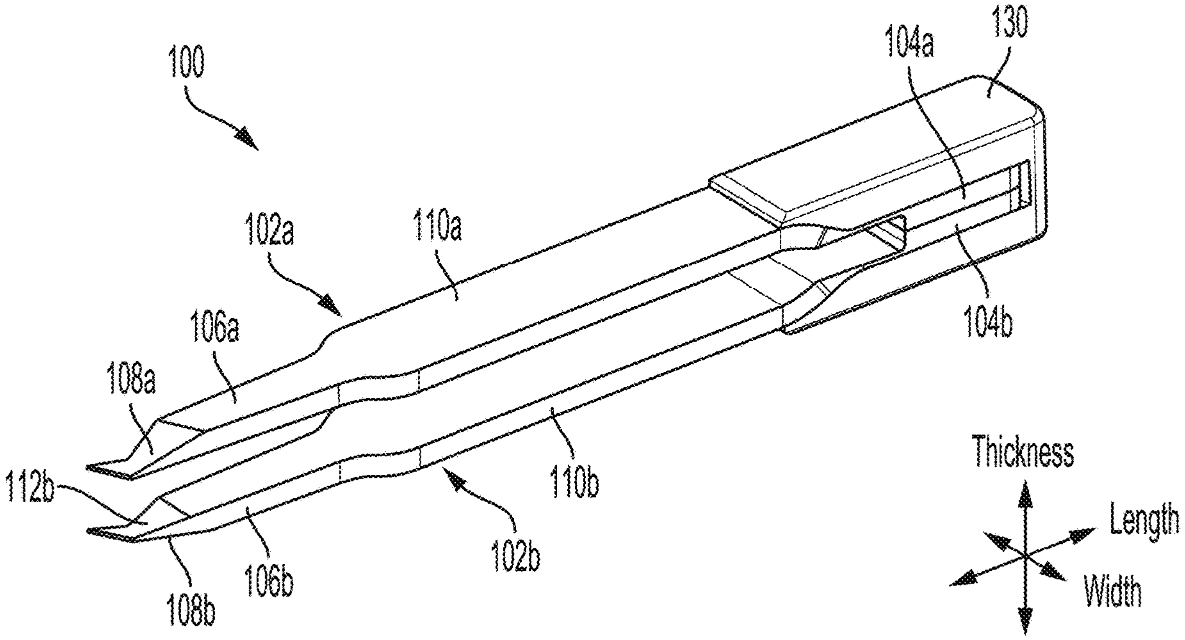
FIG. 2 illustrates a perspective view of a tweezers, according to an aspect of the present disclosure.

An example of tweezers 100 is shown in FIG. 2. Tweezers 100 include a leg 102*a* (e.g., a first leg) and a leg 102*b* (e.g., a second leg). Leg 102*a* includes a proximal portion 104*a*, a distal portion 106*a*, and a central portion 110*a*. Distal portion 106*a* includes a tip 108*a*. Leg 102*b* includes a proximal portion 104*b*, a distal portion 106*b*, and a central portion 110*b*. Distal portion 106*b* includes a tip 108*b*. When using tweezers 100, a user applies force to leg 102*a* and leg 102*b* to grasp an object between tip 108*a* and tip 108*b*. Typically, the user applies this force to the central portion 110*a* of leg 102*a* and the central portion 110*b* of leg 102*b*. Tip 108*a* includes an interior surface 112*a* (FIG. 3), which contacts the grasped object. Similarly, tip 108*b* includes an interior surface 112*b* that contacts the grasped object.

Tweezers may additionally include a cap 130 disposed over proximal portion 104*a* and proximal portion 104*b*. Cap 130 will be described in further detail in connection with FIG. 10. In some implementations, cap 130 may be omitted.

The following description of tweezers 100 will include references to a thickness, length, or width of certain portions of tweezers 100. FIG. 2 includes a set of axes that define the axial directions associated with a thickness, a length, and a width relative to tweezers 100. The definitions provided by these axes apply throughout this description unless stated otherwise.

Figure 3:
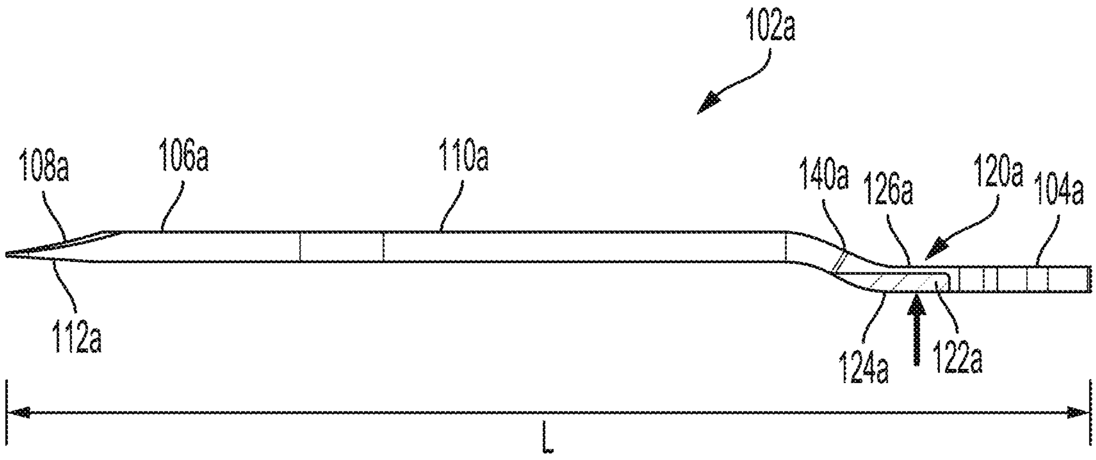
FIG. 3 illustrates a side view of a leg of the tweezers, according to an aspect of the present disclosure.
Figure 4:
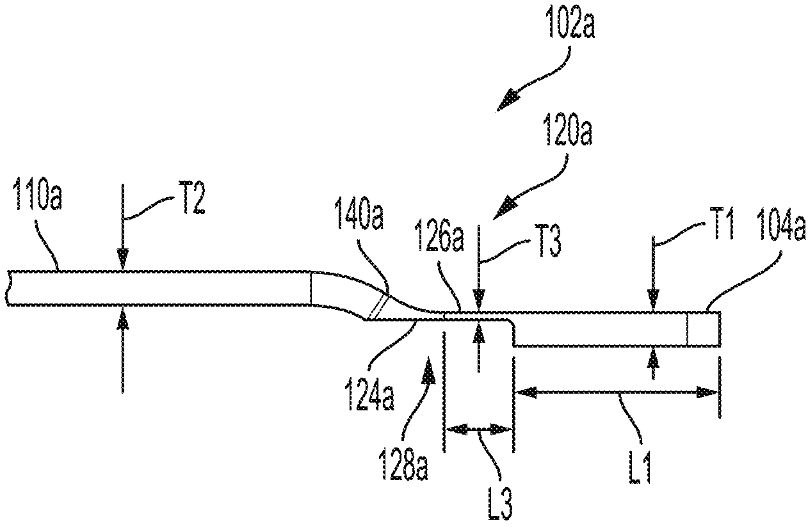
FIG. 4 illustrates a side view of a flexure portion of the leg of FIG. 3, according to an aspect of the present disclosure.

Leg 102*a* includes a flexure portion 120*a*, shown in FIGS. 3 and 4, at which leg 102*a* may flex (e.g., elastically deform) along a length L of leg 102*a*. Flexure portion 120*a* includes an interior surface 124*a* that faces the leg 102*b*, and an exterior surface 126*a* that faces away from leg 102*b*. In some implementations, flexure portion 120*a* may be formed by removing material 122*a* (FIG. 3) from flexure portion 120*a* to create a recess 128*a* (FIG. 4), thereby reducing a thickness of the flexure portion 120*a*. For example, grinding may be used to grind interior surface 124*a* in the direction of the illustrated arrow such that material 122*a* is ground away to create recess 128*a*.

When leg 102*a* flexes during use of tweezers 100, exterior surface 126*a* is in tension whereas interior surface 124*a* is in compression. Removing (e.g., grinding) material 122*a* from interior surface 124*a* rather than exterior surface 126*a* can improve durability of flexure portion 120*a* in view of this surface force profile. For instance, tensile failure occurs more often than compressive failure, and thus by removing material 122*a* from the interior surface 124*a*, the side in compression, the surface roughness of the exterior surface 126*a* is minimized (e.g., the exterior surface 126*a* remains smooth) as compared to if material were removed from exterior surface 126*a*, which would increase surface roughness of the exterior surface 126*a*. Surface roughness can significantly influence crack initiation by creating stress concentration points. Thus, increasing the surface roughness in the side in compression rather than tension can improve durability of flexure portion 120*a*.

As shown in FIG. 4, proximal portion 104*a* has a thickness T1, central portion 110*a* has a thickness of T2, and flexure portion 120*a* has a minimum thickness of T3. Flexure portion 120*a* may include a transition portion 140*a* through which a thickness of leg 102*a* gradually increases from the minimum thickness T3 to the thickness T2 of the central portion 110*a*.

The minimum thickness T3 of flexure portion 120*a* is less than each of the thickness T1 of proximal portion 104*a* and the thickness T2 of central portion 110*a*. The first thickness T1 of proximal portion 104*a* may be equal or unequal to the second thickness T2 of central portion 110*a*. In various implementations, the thickness T1 or the thickness T2, or both, is within a range of 1.5 to 2.5 millimeters (mm), 1.75 to 2.25 mm, 1.85 to 2.15 mm, or 1.9 to 2.1 mm. For example, the thickness T1 or the thickness T2, or both, may be 2.0 mm. In various implementations, the minimum thickness T3 is within a range of 0.1 to 2 mm, 0.1 to 1.5 mm, 0.1 to 1.0 mm, or 0.1 to 0.75 mm. In various implementations, a ratio of the minimum thickness T3 to the thickness T2 is within a range of 0.040 to 0.500, 0.050 to 0.500, 0.060 to 0.500, 0.040 to 0.375, 0.050 to 0.375, 0.060 to 0.375, 0.040 to 0.300, 0.050 to 0.300, or 0.060 to 0.300.

With continued reference to FIG. 4, the minimum thickness T3 of the flexure portion 120*a* extends a length L3. In various implementations, the length L3 is within a range of 2.0 to 6.0 mm, 2.5 to 6.0 mm, 3.0 to 6.0 mm, 3.5 to 6.0 mm, 4.0 to 6.0 mm, 4.5 to 6.0 mm, 2.5 to 5.5 mm, 2.5 to 5.0 mm, 3.5 to 5.5 mm, 3.5 to 5.0 mm, or 4.0 to 5.5 mm. In various implementations, a ratio of the length L3 to the length L of the leg 102*a* is within a range of 0.030 to 0.070, 0.40 to 0.70, 0.50 to 0.70, 0.030 to 0.060, 0.030 to 0.050, 0.40 to 0.060, or 0.040 to 0.055. In various implementation, the length L is within a range of 85 to 95 mm. For example, the length L may be 90 mm. In various implementations, a length L1 of the proximal portion 104*a* is within a range of 6 to 14 mm or 8 to 12 mm.

Figure 5:
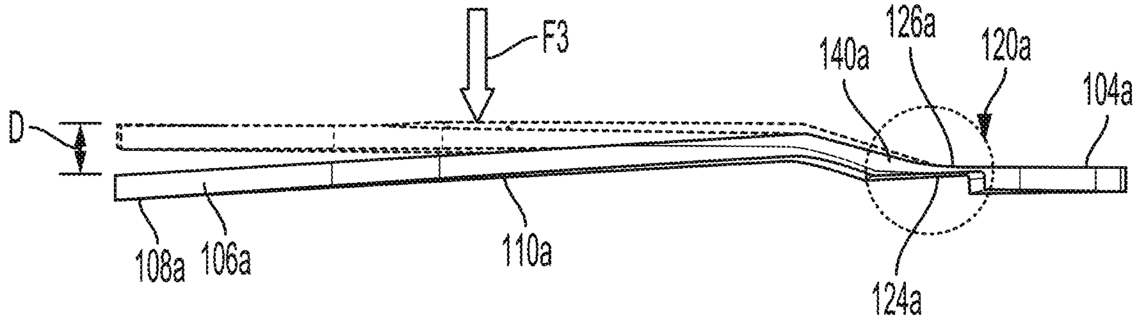
FIG. 5 illustrates a side view of a leg of the tweezers deformed at the flexure portion, according to an aspect of the present disclosure.

When a force F3, a force consistent with normal usage of tweezers 100, is applied to leg 102*a*, as shown in FIG. 5, the dotted circle indicates that leg 102*a* flexes at the flexure portion 120*a*. In particular, leg 102*a* flexes at the segment of the flexure portion 120*a* that has the minimum thickness T3. No other portion of leg 102*a*, including central portion 110*a*, flexes other than the flexure portion 120*a* when force F3 is applied. Stated differently, deformation of leg 102*a* is localized to the flexure portion 120*a*. Flexure portion 120*a*, in this way, acts as a resilient member that biases leg 102*a* away from contacting leg 102*b* and elastically deforms when that bias is overcome.

Leg 102*a* may include a material having a hardness that provides the minimum thickness T3 segment of the flexure portion 120*a* with sufficient yield strength to allow the flexure portion 120*a* to flex over many cycles without failing. For example, the material may have a hardness within a range of 53 to 57 HRC, which is greater than typical tweezers. The increased hardness of the material of leg 102*a* may also improve durability of the tip 108*a* compared to typical tips of tweezers. In an example, the material may be a metal. For example, the material may be a hardened steel. For example, the material may be a hardened and tempered martensitic chromium stainless steel. In other examples, leg 102*a* may include a composite material or a plastic material.

When force F3 is applied to leg 102*a*, the tip 108*a* may be displaced to a maximum depth D. In various implementations, a value of maximum depth D may be within a range of 1.5 to 2.0 mm.

The description of leg 102*a* in connection with FIGS. 3 to 5 applies equally to leg 102*b* and will therefore not be repeated for the illustrated flexure portion 120*b*, transition portion 140*b*, or interior surface 124*b* of leg 102*b* for brevity.

Figure 6:
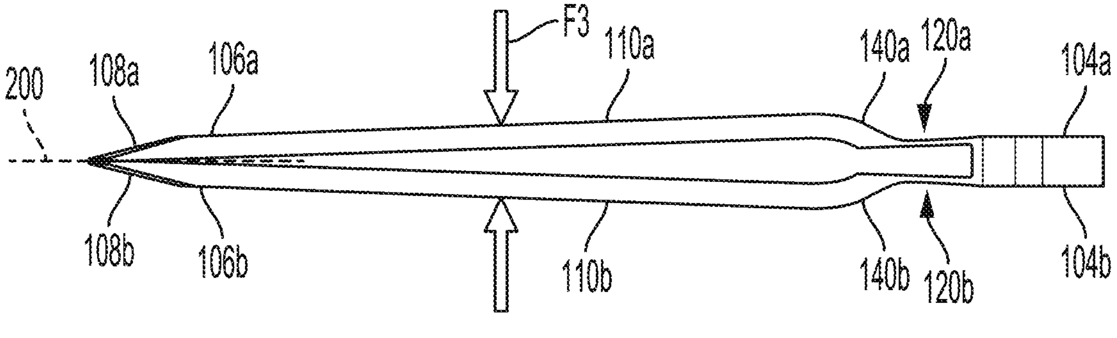
FIG. 6 illustrates a side view of the tweezers with the tips in parallel contact, according to an aspect of the present disclosure.

Localizing deformation of legs 102*a*, 102*b* at flexure portions 120*a*, 120*b* when force F3 is applied enables effective parallel tip geometry. Specifically, FIG. 6 shows that when tip 108*a* is brought into contact with tip 108*b*, the interior surface 112*a* of tip 108*a* contacts the interior surface 112*b* of tip 108*b* along the dashed line 200. Stated differently, when the interior surface 112*a* is brought into contact with the interior surface 112*b*, the interior surface 112*a* is parallel to the interior surface 112*b*. With the interior surfaces 112*a*, 112*b* contacting in this way, in some aspects, an entirety of the interior surface 112*a* contacts an entirety of the interior surface 112*b*. In various implementations, a length of the interior surface 112*a* is within a range of 0.5 to 6 mm, 0.5 to 5 mm, 0.5 to 4 mm, or 0.5 to 3 mm. A length of the interior surface 112*b* may be similar to, or the same as, the length of the interior surface 112*a*.

Figure 9:
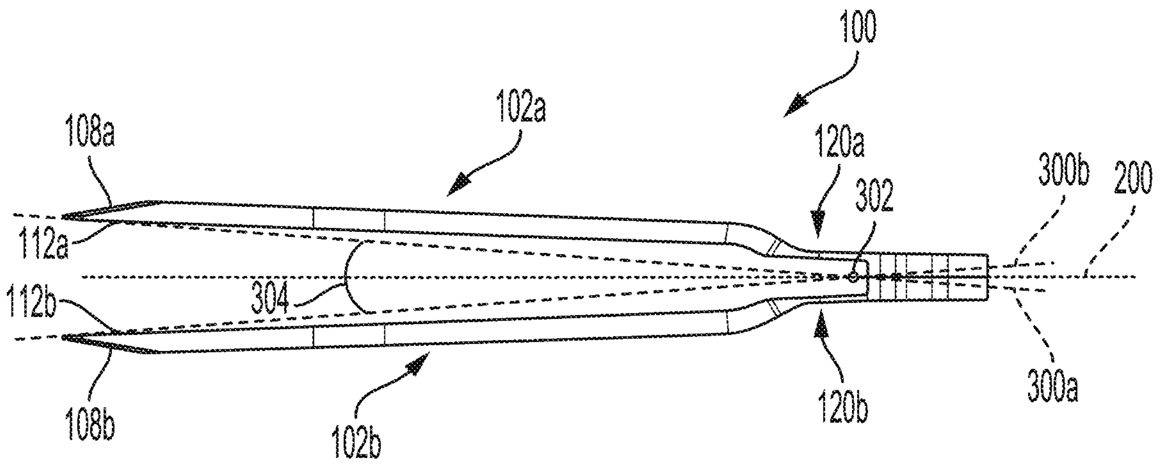
FIG. 9 illustrates a side view of the tweezers without a cap installed, according to an aspect of the present disclosure
Figure 10:
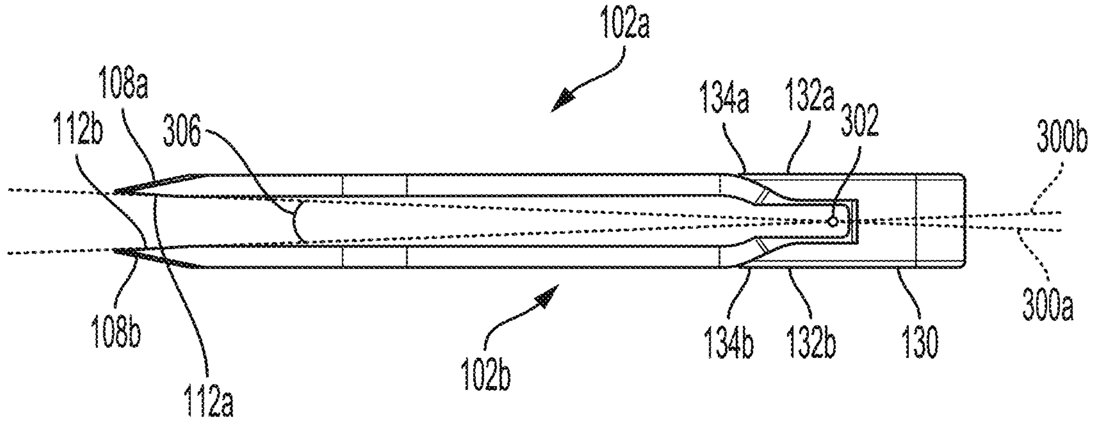
FIG. 10 illustrates a side view of the tweezers of FIG. 9 with the cap installed, according to an aspect of the present disclosure.

Referring now to FIGS. 9 and 10, the parallel contact between interior surfaces 112*a*, 112*b* is realized through a particular orientation of interior surfaces 112*a*, 112*b*. In particular, FIGS. 9 and 10 show a dashed line 300*a* extending along the interior surface 112*a*, and a dashed line 300*b* extending along the interior surface 112*b*. FIG. 9 shows legs 102*a*, 102*b* splayed apart at an angle 304 between lines 300*a*, 300*b*. FIG. 10 shows legs 102*a*, 102*b* splayed apart at an angle 306 between lines 300*a*, 300*b*. Regardless of the splay angle between legs 102*a*, 102*b*, in each of FIGS. 9 and 10, dashed lines 300*a*, 300*b* intersect at a point 302 that also intersects dashed line 200. With this orientation, a line extending along the length of central portion 110*a* intersects line 300*a*. Similarly, a line extending along the length of central portion 110*b* intersects line 300*b*.

Typical tweezers (e.g., tweezers 10) often utilize one of a rectangular (e.g., slant) tip or a pointed tip geometry. The slant tip geometry is more common for wide grip uses, such as grasping multiple hairs at once, whereas the pointed tip geometry is more common for precision work, such as grasping a single hair. In some implementations, tips 108*a*, 108*b* of tweezers 100 may similarly have one of a slant tip geometry or a pointed tip geometry. In other implementations, tips 108*a*, 108*b* of tweezers 100 may have a hybrid tip geometry that offers the advantage of wider grip uses and precision work in one tool. In particular, the hybrid tip geometry includes both a slant tip and a pointed tip.

Figure 7A:
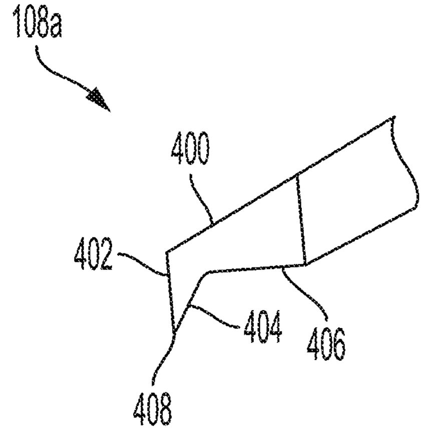
FIG. 7A illustrates a side view of a tip of a leg of the tweezers in a point orientation, according to an aspect of the present disclosure.
Figure 7B:
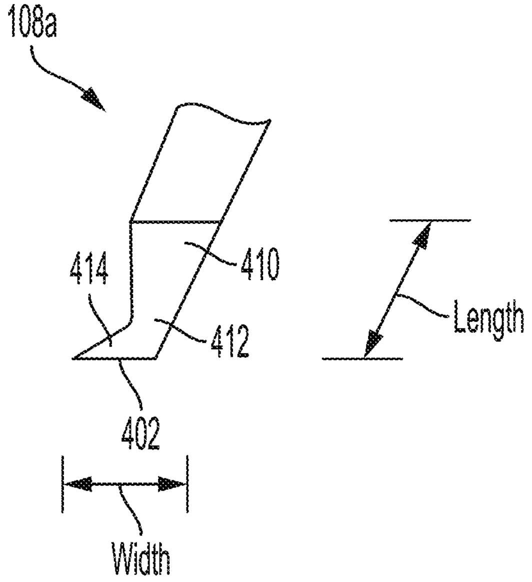
FIG. 7B illustrates a side view of the tip of FIG. 7A in a flat edge orientation, according to an aspect of the present disclosure.

FIGS. 7A and 7B depict an example hybrid tip geometry of tip 108*a*. The description applies equally to tip 108*b*. In this example, tip 108*a* includes edges 400, 402, 404, and 406. The edge 402 forms a flat, slanted tip and is referred to as a distal most end of tip 108*a*. The edges 402 and 404 meet to form a pointed tip 408 such that an angle formed by the edges 402 and 404 is greater than zero degrees and less than forty-five degrees. The hybrid tip geometry is such that tip 108*a* includes a first portion 410 having a first width, a second portion 412 having a second width, and a third portion 414 having a third width. The second width is less than each of the first width and the third width, and the second portion 412 is disposed between the first portion 410 and the third portion 414 along a length of leg 102*a*.

FIG. 7A shows tip 108*a* orientated for precision work. For example, the pointed tip 408 of tip 108*a* may be used to grasp a single hair along with tip 108*b*.

FIG. 7B shows tip 108*a* orientated for wide grip use. For example, the edge 402 that forms the slanted tip of tip 108*a* may be used to grasp multiple hairs at once along with tip 108*b*.

With typical tweezers (e.g., tweezers 10), there is a delicate balance between how well the tips grip and pull one or more hairs (or another object), which is preferred, and how likely the tips are to cut the one or more hairs (or another object), which is not preferred. Typically, there must be a compromise in the design given that tips which apply higher pressure will pull harder but are also more likely to cut. The tweezers 100 mitigate this problem by employing the parallel tip geometry with greater contact area as described above. In some aspects, the coefficient of friction of the interior surfaces 112*a*, 112*b* of tips 108*a*, 108*b* may be increased to further improve pull and grip force without cutting the one or more hairs (or other object) by texturing the interior surfaces 112*a*, 112*b*. For example, a texture may be laser engraved into the interior surfaces 112*a*, 112*b*.

A method of manufacture of tweezers 100 will now be described with reference to FIGS. 8A to 10. Initially, the general shape of each leg 102*a*, 102*b* may be formed from bulk material (e.g., steel). For example, the general shape of each leg 102*a*, 102*b* may be stamped out from bulk steel (e.g., a steel sheet). At this stage, in this example, the bulk steel is sufficiently soft so that the general shape of each leg 102*a*, 102*b* may be stamped out. The stamped out legs 102*a*, 102*b* may then each be heat treated to harden the steel. For example, as described above, the heat treatment raises the hardness of the steel to within a range of 53 to 57 HRC.

Figure 8A:
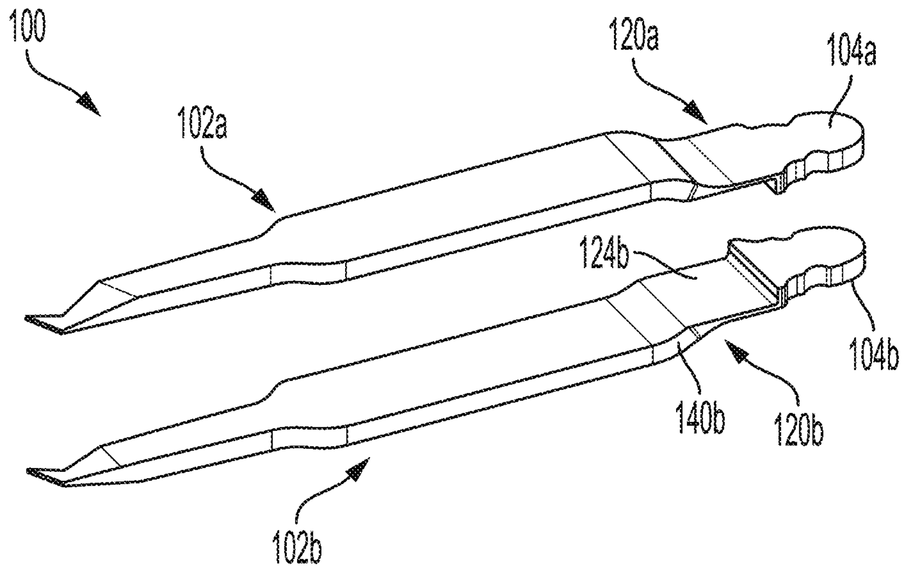
FIG. 8A illustrates a perspective view of the two legs of the tweezers separate from one another, according to an aspect of the present disclosure.
Figure 8B:
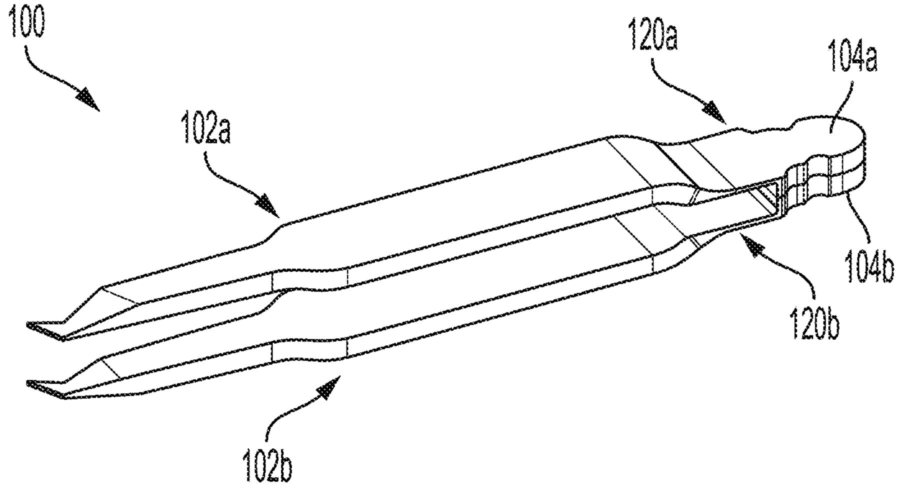
FIG. 8B illustrates a perspective view of the two legs of FIG. 8A coupled together, according to an aspect of the present disclosure.

With the steel hardened, at least some of the specific shape of each leg 102*a*, 102*b* may be formed. In particular, the interior surfaces 124*a*, 124*b* may be ground to form the flexure portions 120*a*, 120*b* of each leg 102*a*, 102*b*. In some aspects, the pattern may be laser-engraved on the interior surfaces 112*a*, 112*b* of tips 108*a*, 108*b*. In some aspects, excess material on tips 108*a*, 108*b* may be ground away to form tips 108*a*, 108*b* into the hybrid tip shape at this stage. FIG. 8A illustrates each leg 102*a*, 102*b* after being hardened and formed. As shown in FIG. 8B, the proximal ends 104*a*, 104*b* may then be joined together. For example, the proximal ends 104*a*, 104*b* may be welded (e.g., resistance welded) together. In some aspects, the excess material is not ground away from tips 108*a*, 108*b* until after the proximal ends 104*a*, 104*b* are joined together.

One manufacturing challenge for tweezers is that any variation in the stamped tweezer legs, materials, or heat-treating process can result in the tips being further or closer apart than desired. For example, FIG. 9 shows tweezers 100 at rest with legs 102*a*, 102*b* splayed away from one another such that line 300*a* and line 300*b* form an angle 304. In this example, the angle 304 is greater than desired.

A solution to this manufacturing challenge is provided by the inclusion of cap 130 that serves as a spring preload mechanism by holding the legs 102*a*, 102*b* at a desired angle 306, as shown in FIG. 10, which is less than angle 304. The inclusion of cap 130 thereby allows for manufacturing variations in the angle that legs 102*a*, 102*b* are splayed apart, since installing cap 130 will hold legs 102*a*, 102*b* at the desired splay angle, thereby resulting in improved consistency for tip 108*a*, 108*b* spacing. Another benefit of cap 130 may be that cap 130 makes it more difficult to pry legs 102*a*, 102*b* apart, which may damage flexure portions 120*a*, 120*b*.

To provide the benefits described above, cap 130 extends from proximal portions 104*a*, 104*b* of legs 102*a*, 102*b* and over flexure portions 120*a*, 120*b* in order to control splay. For instance, cap 130 may extend such that cap 130 terminates adjacent to transition portions 140*a*, 140*b* or adjacent to central portions 110*a*, 110*b*. For example, cap 130 shown in FIG. 10, include arms 132*a*, 132*b* that extend to distal ends 134*a*, 134*b* that are adjacent to transition portions 140*a*, 140*b*.

Figure 11:
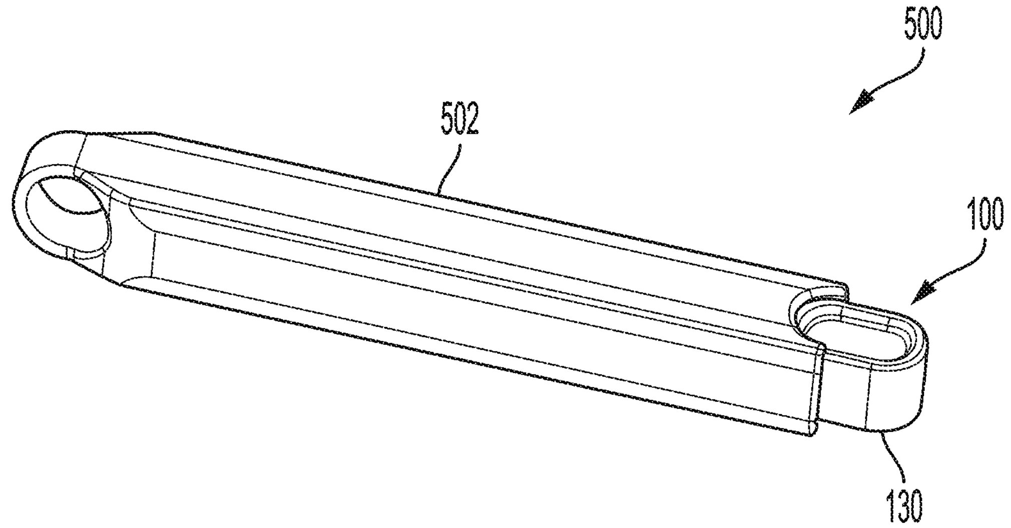
FIG. 11 illustrates a perspective view of the tweezers positioned within a protective sleeve, according to an aspect of the present disclosure.

In some implementations, tweezers 100 may be provided with a sleeve 502 as shown in the system 500 of FIG. 11. Sleeve 502 defines an interior into which tweezers 100 may be inserted, such as up to cap 130. In this way, sleeve 502 may protect tweezers 100 from damage when the tweezers are not in use.

Figure 12:
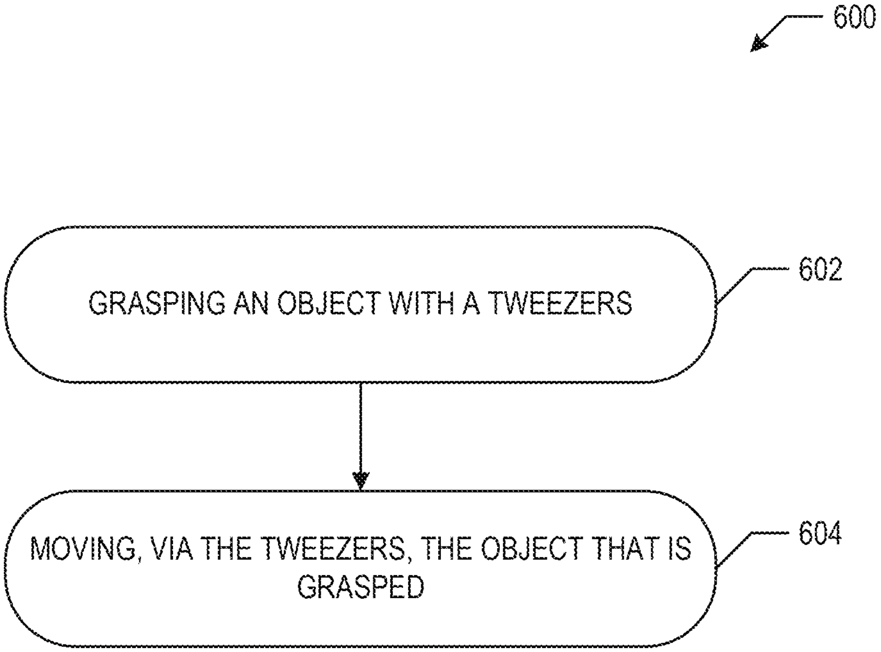
FIG. 12 is a flow chart of an example method of moving an object with tweezers, according to an aspect of the present disclosure.

FIG. 12 is a flow chart illustrating an example method 600 for moving an object with tweezers. Method 600 includes, at block 602, grasping an object with tweezers (e.g., tweezers 100). For example, the object is grasped between a first tip (e.g., tip 108*a*) and a second tip (e.g., tip 108*b*) of tweezers 100. For example, a hair may be grasped with the tweezers 100. Other examples of the object may include a microchip, a circuit board element, a splinter, a tissue sample, surgical sutures, microscopic specimens, miniature screws or fasteners, among other examples. In some aspects, grasping the object with the tweezers 100 includes applying a force (e.g., force F3) to the first leg (e.g., leg 102*a*) and the second leg (e.g., leg 102*b*), and deformation of the first leg 102*a* in response to the force applied is localized to a flexure portion (e.g., flexure portion 120*a*) of the first leg 102*a*.

At block 604, method 600 includes moving, via the tweezers 100, the object that is grasped. For example, a grasped hair may be moved to a sink.

It is noted additional blocks (or method steps) may be added to the blocks (or method steps) described with reference to FIG. 12, or some of the blocks (or method steps) may be omitted.

In one or more aspects, the present tweezers may include additional aspects, such as any single aspect or any combination of aspects described below or in connection with one or more other processes or devices described elsewhere herein. In a first aspect, a tweezers includes a first leg and a second leg. The first leg comprises a distal portion including a tip, a proximal portion having a first thickness, a central portion disposed between the distal portion and the proximal portion, the central portion having a second thickness, and a flexure portion disposed between the central portion and the proximal portion. The flexure portion has a third thickness less than each of the first thickness and the second thickness. The second leg is coupled to the first leg at the proximal portion.

In a second aspect, in combination with the first aspect, when a force is applied to the first leg towards the second leg, deformation of the first leg is localized to the flexure portion.

In a third aspect, in combination with one or more of the first aspect or the second aspect, the first leg includes a material having a hardness within a range of 53 to 57 Hardness Rockwell C, inclusive.

In a fourth aspect, in combination with one or more of the first aspect through the third aspect, an interior surface of the first leg is recessed at the flexure portion such that the third thickness is less than each of the first thickness and the second thickness, the interior surface facing the second leg.

In a fifth aspect, in combination with one or more of the first aspect through the fourth aspect, a ratio of the third thickness to the second thickness is within a range of 0.05 to 0.375, inclusive.

In a sixth aspect, in combination with one or more of the first aspect through the fifth aspect, the third thickness is within a range of 0.1 to 0.75 millimeters (mm), inclusive.

In a seventh aspect, in combination with one or more of the first aspect through the sixth aspect, the first leg has a first length and the flexure portion has a second length, and a ratio of the second length to the first length is within a range of 0.040 to 0.055, inclusive.

In an eighth aspect, in combination with one or more of the first aspect through the seventh aspect, the first leg has a first length and the flexure portion has a second length, and the second length is within a range of 3.5 to 5 mm, inclusive.

In a ninth aspect, in combination with one or more of the first aspect through the eighth aspect, the first thickness is equal to the second thickness.

In a tenth aspect, in combination with one or more of the first aspect through the ninth aspect, the tip is a first tip and includes a first interior tip surface, and the second leg comprises a second distal portion including a second tip, the second tip including a second interior tip surface. In the tenth aspect, the first interior tip surface is parallel to the second interior tip surface when a force is applied to the first and second legs such that the first interior tip surface is brought into contact with the second interior tip surface.

In an eleventh aspect, in combination with one or more of the first aspect through the tenth aspect, the tip is a first tip and includes a first interior tip surface, and the second leg comprises a second distal portion including a second tip, the second tip including a second interior tip surface. In the eleventh aspect, when a force is applied to the first and second legs such that the first interior tip surface is brought into contact with the second interior tip surface, a length of the first interior tip surface that contacts the second interior tip surface is within a range of 0.5 to 6 mm.

In a twelfth aspect, in combination with one or more of the first aspect through the eleventh aspect, the tip includes a first portion having a first width, a second portion having a second width, and a third portion having a third width. The second width is less than each of the first width and the third width. The second portion is disposed between the first portion and the third portion along a length of the first leg.

In a thirteenth aspect, in combination with one or more of the first aspect through the twelfth aspect, starting from a distal most end of the tip and moving towards the proximal portion of the first leg, a width of the tip decreases and then increases.

In a fourteenth aspect, in combination with one or more of the first aspect through the thirteenth aspect, a distal most end of the tip includes a flat edge, the tip further including a second edge, and the flat edge and the second edge are joined at a point and form an angle less than 45 degrees.

In a fifteenth aspect, a method includes grasping an object with a tweezers, and moving, via the tweezers, the object that is grasped. The tweezers are the tweezers of the first aspect, which may be combined with one or more of the second aspect through the fourteenth aspect.

In a sixteenth aspect, in combination with the fifteenth aspect, the grasping the object with the tweezers includes applying a force to the first and second legs, and the deformation of the first leg is localized to the flexure portion when the force is applied.

The above specification and examples provide a complete description of the structure and use of illustrative embodiments. Although certain embodiments have been described above with a certain degree of particularity, or with reference to one or more individual embodiments, those skilled in the art could make numerous alterations to the disclosed embodiments without departing from the scope of this invention. As such, the various illustrative embodiments of the products, systems, and methods are not intended to be limited to the particular forms disclosed. Rather, they include all modifications and alternatives falling within the scope of the claims, and embodiments other than the one shown may include some or all of the features of the depicted embodiment. For example, elements may be omitted or combined as a unitary structure, and/or connections may be substituted. Further, where appropriate, aspects of any of the examples described above may be combined with aspects of any of the other examples described to form further examples having comparable or different properties and/or functions, and addressing the same or different problems. Similarly, it will be understood that the benefits and advantages described above may relate to one embodiment or may relate to several embodiments.

The claims are not intended to include, and should not be interpreted to include, means-plus- or step-plus-function limitations, unless such a limitation is explicitly recited in a given claim using the phrase(s) "means for" or "step for," respectively.

The invention claimed is:

1. A tweezers comprising:
- a first leg comprising:
  - a distal portion including a tip,
  - a proximal portion having a first thickness,
  - a central portion having a second thickness, and
  - a flexure portion disposed between the central portion and the proximal portion, the flexure portion having a minimum thickness less than each of the first thickness and the second thickness; and
- a second leg coupled to the first leg, wherein when a force is applied to urge the first and second legs toward one another, elastic deformation of the first leg is localized to the flexure portion.

2. The tweezers of claim 1, wherein no portion of the first leg other than the flexure portion undergoes elastic deformation when the force is applied.

3. The tweezers of claim 1, wherein the first leg includes a material having a hardness within a range of 53 to 57 Hardness Rockwell C, inclusive.

4. The tweezers of claim 1, wherein a ratio of the minimum thickness to the second thickness is within a range of 0.05 to 0.375, inclusive.

5. The tweezers of claim 1, wherein the minimum thickness is within a range of 0.1 to 0.75 millimeters (mm), inclusive.

6. The tweezers of claim 1, wherein:
- the first leg has a first length and the flexure portion has a second length, and
- a ratio of the second length to the first length is within a range of 0.040 to 0.055, inclusive.

7. The tweezers of claim 1, wherein:
- the first leg has a first length and the flexure portion has a second length, and
- the second length is within a range of 3.5 to 5 mm, inclusive.

8. The tweezers of claim 1, wherein the first thickness is equal to the second thickness.

9. The tweezers of claim 1, wherein:
- the tip is a first tip and includes a first interior tip surface,
- the second leg comprises a second distal portion including a second tip, the second tip including a second interior tip surface, and
- the first interior tip surface is parallel to the second interior tip surface when a force is applied to the first and second legs such that the first interior tip surface is brought into contact with the second interior tip surface.

10. The tweezers of claim 1, wherein:
- the tip is a first tip and includes a first interior tip surface,
- the second leg comprises a second distal portion including a second tip, the second tip including a second interior tip surface, and
- when a force is applied to the first and second legs such that the first interior tip surface is brought into contact with the second interior tip surface, a length of the first interior tip surface that contacts the second interior tip surface is within a range of 0.5 to 6 mm, inclusive.

11. The tweezers of claim 1, wherein:
- the tip includes a first portion having a first width, a second portion having a second width, and a third portion having a third width,
- the second width is less than each of the first width and the third width, and
- the second portion is disposed between the first portion and the third portion along a length of the first leg.

12. The tweezers of claim 1, wherein starting from a distal most end of the tip and moving towards the proximal portion of the first leg, a width of the tip decreases and then increases.

13. The tweezers of claim 1, wherein a distal most end of the tip includes a flat edge, the tip further including a second edge, wherein the flat edge and the second edge are joined at a point and form an angle less than 45 degrees.

14. The tweezers of claim 1, wherein the hardness is sufficient to provide the flexure portion with a yield strength that prevents plastic deformation during normal use.

15. A tweezers comprising:
- a first leg comprising:
  - a distal portion including a tip,
  - a proximal portion having a first thickness,
  - a central portion disposed between the distal portion and the proximal portion, the central portion having a second thickness, and
  - a flexure portion disposed between the central portion and the proximal portion, the flexure portion having a minimum thickness less than each of the first thickness and the second thickness; and
- a second leg coupled to the first leg at the proximal portion,
- wherein an interior surface of the first leg is recessed at the flexure portion such that the minimum thickness is less than each of the first thickness and the second thickness, the interior surface facing the second leg.

16. A method of grasping and moving an object with a tweezers comprising:
- grasping the object with the tweezers; and
- moving, via the tweezers, the object that is grasped, the tweezers comprising:
  - a first leg comprising:
    - a distal portion including a tip,
    - a proximal portion having a first thickness,
    - a central portion having a second thickness, and
    - a flexure portion disposed between the central portion and the proximal portion, the flexure portion having a minimum thickness less than each of the first thickness and the second thickness; and a second leg coupled to the first leg, wherein when a force is applied to urge the first and second legs toward one another, elastic deformation of the first leg is localized to the flexure portion.

17. The method of claim 16, wherein:

the grasping the object with the tweezers includes applying a force to the first and second legs, and deformation of the first leg is localized to the flexure portion when the force is applied.

18. The method of claim 16, wherein the first leg includes a material having a hardness within a range of 53 to 57 Hardness Rockwell C, inclusive.

19. The method of claim 16, wherein an interior surface of the first leg is recessed at the flexure portion such that the minimum thickness is less than each of the first thickness and the second thickness, the interior surface facing the second leg.

20. The method of claim 16, wherein a ratio of the minimum thickness to the second thickness is within a range of 0.05 to 0.375, inclusive.

21. The method of claim 16, wherein the tip includes a first portion having a first width, a second portion having a second width, and a third portion having a third width, wherein the second width is less than each of the first width and the third width, and wherein the second portion is disposed between the first portion and the third portion along a length of the first leg.

* * * * *